United States Patent [19]
Kuntz et al.

[11] Patent Number: 4,865,812
[45] Date of Patent: Sep. 12, 1989

[54] INTEGRAL SPECIMEN COLLECTION TUBE AND MICROSCOPE SLIDE DEVICE

[75] Inventors: David H. Kuntz, Los Angeles; Louis F. Muller, El Segundo, both of Calif.

[73] Assignee: Davstar Industries, Inc., Newport Beach, Calif.

[21] Appl. No.: 10,344

[22] Filed: Feb. 3, 1987

[51] Int. Cl.⁴ .............................................. G01N 1/28
[52] U.S. Cl. .................................... 422/99; 422/58; 422/63; 422/64; 422/72; 422/101; 422/102; 436/45; 436/46; 436/165; 436/177; 356/246
[58] Field of Search ................ 422/58, 72, 99, 101, 422/102, 56, 63, 64; 436/177, 165, 809, 45, 46; 356/246

[56] References Cited
U.S. PATENT DOCUMENTS

| | | | |
|---|---|---|---|
| 3,814,522 | 6/1974 | Clark et al. | 422/102 X |
| 4,066,414 | 1/1978 | Selby | 422/102 |
| 4,468,371 | 8/1984 | Chen et al. | 436/809 X |
| 4,495,289 | 1/1985 | Lyman et al. | 422/102 X |
| 4,654,197 | 3/1987 | Lilja et al. | 422/56 |

Primary Examiner—Barry S. Richman
Assistant Examiner—Lynn M. Kummert
Attorney, Agent, or Firm—Henry M. Bissell

[57] ABSTRACT

The unitary device includes a generally tubular container having a generally central specimen collection space communicating with the open upper end of the container, and a microscope slide member below and integral with the container and having transparent flat front and rear walls throughout at least a portion thereof, and a central cavity therebetween communicating with the container space through the lower end of the container. The container is adapted to serve as a centrifugation tube and a permanent handle for manipulation of the microscope slide member. The back of the device is generally flat and the front and sides of the collection tube are generally rounded. In one embodiment, the device is of thermoformed plastic and may include a flexible front wall in the microscope slide member, overlaid by a removable flexible support strip attached thereto by spaced ribs of adhesive so that such front wall ripples and flexes during removal of the strip to uniformly mix sediment collected in the cavity. The depth of the microscope slide member may be decreased by a stepped portion in the back thereof.

20 Claims, 1 Drawing Sheet

INTEGRAL SPECIMEN COLLECTION TUBE AND MICROSCOPE SLIDE DEVICE

BACKGROUND OF THE INVENTION

The present invention generally relates to laboratory equipment and, more particularly, to an integral biological specimen collection tube and microscope slide constructed as a unitary device.

Various types of laboratory devices have been devised in the past for the collection and handling of biological specimens. Certain of such devices are used particularly in laboratory centrifuges and the like. Complete urinalysis typically involves centrifugation of the specimen to isolate any sediment for microscopic study. Most current procedures and devices require pouring the test liquid into a centrifuge tube and separately decanting the liquid from the sediment after centrifugation, then transferring the sediment to a microscope slide. Such procedures are time-consuming and expensive. Moreover, these individual steps are multiple in character, take the time of the technician, and increase the technician's contact with the specimen.

An improved combination collector tube and microscope slide member is described in U.S. Pat. No. 4,066,414. The tube and slide member are connected by a narrow, weak, frangible neck intended to be snapped through to remove the collection tube when the slide member is to be used. However, manufacturing and handling difficulties may occur with such a device. Moreover, the small delicate slide member must be separately handled, usually by mounting it in a secondary carrier, in order to place it into viewing position.

There remains a need for an improved type of device which can be used for initial biological liquid collection, subsequent centrifugation, sediment isolation and microscopic examination, all without transferring the test materials to other laboratory equipment. Such a device should include, therefore, a collector portion and a microscope slide member. The latter should be capable of being readily handled while connected to the collector tube so that the slide member is not damaged and can be maneuvered into place. It would also be desirable if the device included means to resuspend the sediment within the microscope slide member. Such device should be capable of being made in various sizes and shapes in order to fit various centrifuge wells and holders and should be sturdy enough throughout to avoid breakage. Moreover, the device should be capable of being fabricated very inexpensively by a rapid procedure such as injection molding or thermoforming from low cost optically transparent rigid material such as plastic. It is further desirable that the device fit on a standard microscope stage with an auxiliary carrier. In addition, some technicians prefer to use a mechanical stage without requiring alteration of the microscope to accommodate the special slide device.

SUMMARY OF THE INVENTION

The improved device of the present invention satisfies all the foregoing needs. The device is substantially as set forth in the accompanying Abstract. Thus, it comprises an upper, hollow, generally tubular container which serves as a specimen collection member, having a central specimen collection space therein communicating with the open upper end of the container. The device also includes a lower integral microscope slide member having transparent flat front and rear walls throughout at least part thereof and defining a central specimen cavity communicating with the container space through the lower end of the container. The juncture between the generally tubular container portion and the slide member portion is a transition section in which the cross-section of the tubular portion reduces to match the cross-section of the slide portion. There is no frangible break line or narrow orifice between the two portions as in the device of patent 4,066,414.

The container also serves as a permanent rigid handle for the microscope slide member. The device may have a flat back throughout and rounded container sides and front. The front wall of the microscope slide member may be thin and flexible, flat and overlaid by a flexible support strip of aluminum, cloth, tape or the like releasably attached thereto by spaced transverse strips of adhesive. Accordingly when the strip is peeled longitudinally from the microscope slide member front wall, barbotage takes place. That is, the front wall flexes and ripples, generating a pressure wave and causing uniform resuspension and redistribution of sediment in the specimen in the microscope slide member cavity for improved viewing and test results. The depth of that slide member can be decreased relative to the remainder of the lower portion of the device by providing a wall step ledge or recess in the back of such slide member.

BRIEF DESCRIPTION OF THE DRAWINGS

A better understanding of the present invention may be realized from a consideration of the following detailed description, taken in conjunction with the accompanying drawings in which.

DESCRIPTION OF THE PREFERRED EMBODIMENT

FIGS. 1-4:

A first preferred embodiment of the improved unitary specimen collection tube and microscope slide device of the present invention is schematically depicted in FIGS. 1-4. It will be understood that the device could also be used for other purposes, such as in the chemical analysis of inorganic materials and the like, but has its greatest applicability to laboratory analysis of specimens such as urine and like biological fluids.

Figures 2, 3:
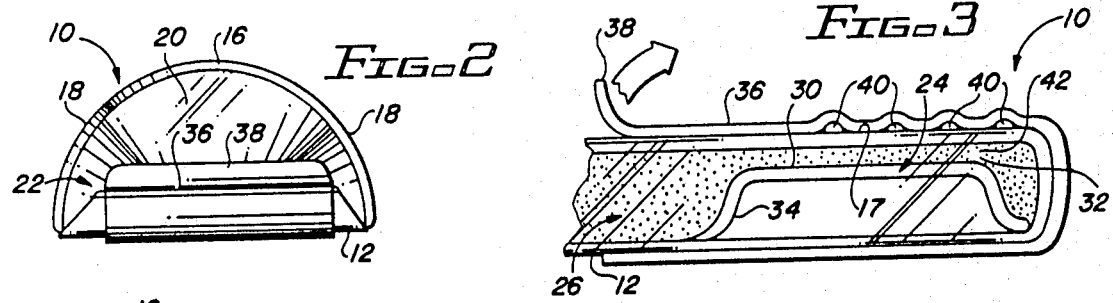
FIG. 2 is a schematic top plan view of the device of FIG. 1.
FIG. 3 is an enlarged fragmentary schematic side elevation of the microscope slide member portion of the device of FIG. 1, shown with a specimen therein for viewing.
Figure 4:
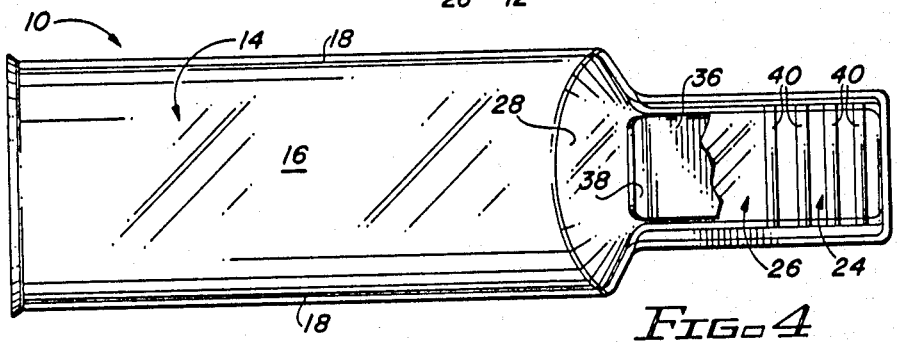
FIG. 4 is a schematic front elevation of the device of FIG. 1.

Device 10 is transparent and comprises a flat rear wall 12 running the length thereof and defining, together with integral curved front wall 16 and side walls 18, an upper specimen collection tube of semi-circular transverse cross-section (FIG. 2). A central specimen collection space 20 is also defined thereby in tube 14, which space 20 communicates with the open upper end 22 of tube 14.

Device 10 also includes a specimen slide member 24 disposed in the lower portion 26 of device 10. Portion 26 constitutes a viewing segment and is integral with the sloped lower end 28 of tube 14. In portion 26, front wall portion 17 and rear wall 12 are flat, transparent, close together and parallel, defining therebetween a cavity 30 which serves as a specimen chamber 32 in member 24. The depth of chamber 32 may be less than that of the remainder of cavity 30 due to the presence of an internal wall step, ledge plug or recessed portion 34 formed in wall 12 and extending forwardly therefrom toward front wall portion 17 in member 24 (FIG. 3).

Portion 34 reinforces the rear wall 12 in member 24 against distortion during centrifugation of device 10, while a flexible strip 36 of aluminum or other metal foil, or cloth, tape or the like can be releasably secured over the flexible front wall 16 in member 24 to reinforce it.

Wall 16 of member 24 is purposely made thin for improved optical viewing. Thus, the flat objective lens of a microscope can be brought up close to the specimen in chamber 32. Wall 16 in this area needs reinforcement by strip 36 during centrifugation of device 10, at which time the centrifugal pressure at the lower tip of device 10 may reach 2000 to 3000 atmospheres. Therefore, strip 36 is in place on device 10 during centrifugation and is removed only when member 24 is to be viewed through a microscope.

Figure 1:
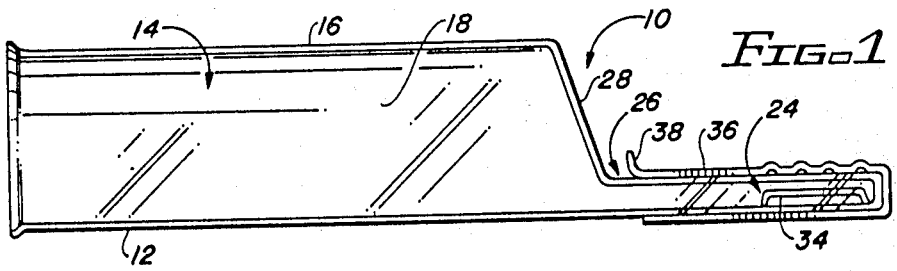
FIG. 1 is a schematic side elevation of a first preferred embodiment of the improved unitary specimen collection tube and microscope slide device of the present invention.

Strip 36 includes a loose end pull tab 38 and is otherwise releasably joined to wall 16 over member 24 by spaced parallel transverse strips 40 of rubber or other suitable adhesive. Strip 36 extends longitudinally of portion 26 and may extend over the lower end or tip of device 10 as shown in FIGS. 1 and 3 for extra reinforcement. When strip 36 is peeled longitudinally from device 10, wall 16 in member 24 flexes and ripples causing barbotage, that is, the generation of a pressure wave in the specimen 42 in chamber 32. This effects uniform mixing and a redistribution of the sediments in the then-filled region of chamber 32, which is desirable for better viewing through a microscope.

Device 10 can be thermoformed or injection molded or the like from relatively thin thermoplastic material such as polyethylene, polypropylene, polyvinyl chloride, polystyrene or the like optically transparent plastic material. Collection tube 14 can be, for example, about 2.0–2.5 inches long, is generally semi-circular in transverse cross-section and may have a maximum diameter of, for example, about 0.8–1.2 inches. The average wall thickness of device 10 may be, for example, about 0.005–0.010 inch or the like. Microscope slide member 24 may be, for example, about 0.8–1.0 inch long ×0.8–1.0 inch wide, with a chamber 32 depth of about 0.010 inch. The depth of cavity 30 outside of chamber 32 may be, for example, about 0.02–0.04 inch or more. The overall length of device 10 may be, for example, 3.8–4.2 inches.

Device 10 can be very inexpensively and rapidly fabricated of thermoplastic material by thermoforming in a vacuum molding operation or by injection molding at conventional temperatures and times. Device 10 is then ready for use in testing biological fluids.

For example, a quantity of human urine can first be introduced in a collection space 20 from the open top 22 of container 14 so that it fills or partially fills cavity 30 and chamber 32. The tests can then be run, for example, in centrifuging device 10 to force any sediment into chamber 32. After centrifugation, liquid is decanted from device 10 through top 22. Slide member 24 can then be handled by holding tube 14 to maneuver slide member 24 under a microscope for microscopic analysis of sediment 42 in chamber 32. Before that is done, however, strip 36 is pulled from wall 16 so as to uniformly distribute sediment 42. Wall 16 is optically transparent and chamber 32 is of shallow depth to facilitate the microscopic examination.

A considerable saving in time and expense and an increase in test accuracy and efficiency are obtained with device 10 which does not require accessory equipment. If a microscope is placed perpendicular to wall 16 and device 10 is maintained upright, microscopic analysis can also be carried out without decantation of urine in device 10. Device 10 is inexpensive, easy and rapid to use and is reusable. If desired, a cell staining agent or the like can be introduced into chamber 32 on the tip of a flat stick or rod at an appropriate point in the test procedure to improve microscopic viewing of the cells in chamber 32. It will be understood that device 10 can be made in various sizes and shapes but that rear wall 12, at least in the area of slide member 24, is flat to facilitate placing slide member 24 on a microscope stage. Multiple specimens can be processed together in the same centrifuge with a consistent chain of identification from specimen container to microscope slide. With devices of the present invention, errors of identification are extremely unlikely to occur.

Figures 5, 6:
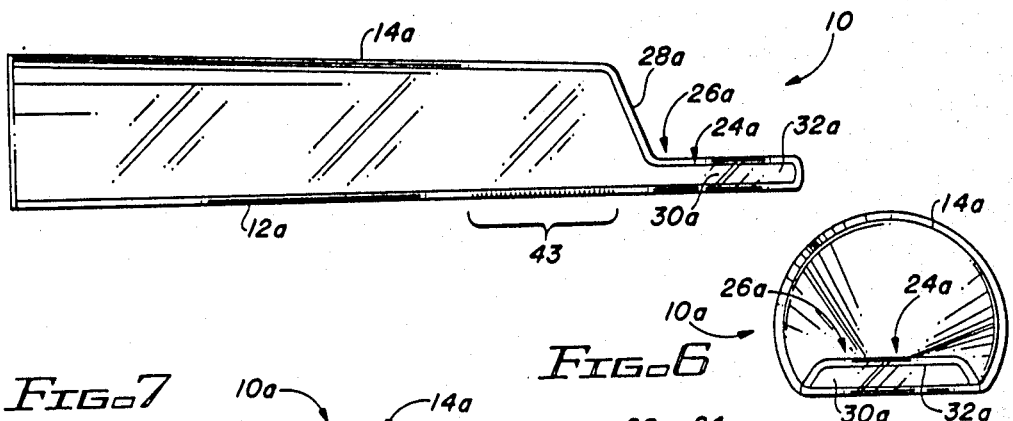
FIG. 5 is a schematic side elevation of a second preferred embodiment of the improved unitary specimen collection tube and microscope slide device of the present invention.
FIG. 6 is a schematic top plan view of the device of FIG. 5.
Figure 7:
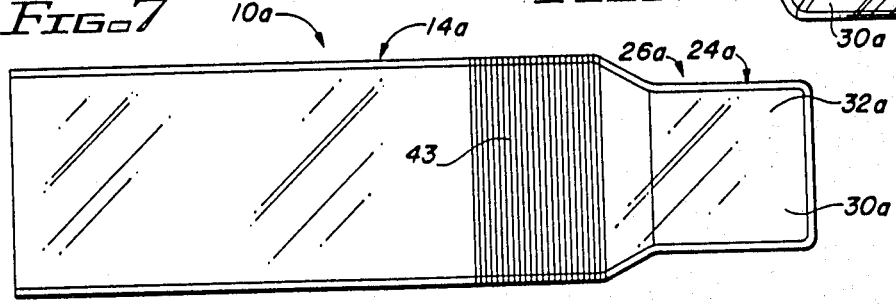
FIG. 7 is a schematic front elevation of the device of FIG. 5.

FIGS. 5–7:

A second preferred embodiment of the improved device of the present invention is schematically depicted in FIGS. 5–7 of the drawings. Thus, device 10a is shown. Components thereof similar to those of device 10 bear the same numerals but are succeeded by the letter "a". In this regard, device 10a is identical to device 10, except for the following:

(a) device 10a is injection molded and has slightly thicker, more rigid walls, for example, 0.020 inch, than device 10;

(b) the transverse cross-section of tube 14a circumscribes a greater portion of a circle than does tube 14;

(c) slide member 24a and lower portion 26a are identical as are cavity 30a and chamber 32a;

(d) no strip comparable to 36 is present, nor is there a step, ledge or recess such as 34; and, (e) rear wall 12a has a frosted portion 43 adjacent sloped portion 28a or in another location upon which to write in order to identify device 10a.

Device 10a performs similarly to, and has the advantages of, device 10.

Although there have been described above specific arrangements of an improved unitary specimen collection tube and microscope slide device in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An integral collection tube and microscope slide device for automatically preparing a specimen for viewing through a microscope by the centrifugation of a collected sample of body fluid, said device comprising in combination:
  (a) a generally upright tubular container, flattened along a rear side thereof and having means defining a generally central specimen collection space, the tubular container having a generally central longitudinal axis aligned with the central collection space, an open upper end communicating with said space, and a lower container end, said container further having a generally flat, planar wall portion with an exterior surface extending longitudinally along the flattened rear side of the container from said open upper end to said lower container end and continuing along a microscope slide member disposed therebelow; and
  (b) said microscope slide member disposed below and integral with said container and having flat optically transparent front and rear walls throughout at least a portion thereof and defining a shallow central cavity therebetween constructed to hold a specimen for microscope inspection, said front and rear walls being spatially separated to define a predetermined thickness of said cavity, said rear wall extending continuously from, and having an exterior surface coplanar with, the exterior surface of said flat planar wall portion of said container, the slide member front wall being closely adjacent said rear wall and parallel thereto to limit the thickness of said central cavity in order to facilitate optical viewing through a microscope of a specimen contained therein, said cavity being in communication with said specimen collection space through said lower end of said container, said container being constructed for use as a centrifugation tube and as a permanent handle for manipulation of said microscope slide member.

2. The improved device of claim 1 wherein said tubular container comprises a collection tube having a front and sides which are generally rounded.

3. The improved device of claim 2 wherein said device includes a sloped transition portion at said lower end of said collection tube wherein said microscope slide member is narrower than said tube and wherein said tube is transparent, except for a frosted portion on an outer wall portion thereof to provide a surface capable of being written on for identification of said device.

4. The improved device of claim 3 wherein said device comprises injection molded plastic and has generally uniform rigid walls.

5. The improved device of claim 1 wherein said device includes a generally flat hollow lower portion, part of which includes said microscope slide member.

6. The improved device of claim 5 wherein said microscope slide member includes means for narrowing the distance between said front and rear walls of said slide member over a portion of said microscope slide central cavity.

7. The improved device of claim 6 wherein said narrowing means comprises a stepped portion in said back wall.

8. The improved device of claim 5 wherein said front wall forming part of said microscope slide member is relatively thin and flexible and is overlaid by a removable flexible support strip attached thereto by spaced portions of adhesive, whereby as said strip is removed from said front wall for viewing of a specimen in said cavity, barbotage is effected, whereby said front wall temporarily ripples and flexes so as to uniformly redistribute sediment in the specimen in said cavity for improved viewing thereof.

9. The improved device of claim 8 wherein said device comprises thermoformed plastic.

10. The device of claim 1 wherein said microscope slide member is generally aligned with the flat planar wall portion of the container, said slide member being substantially displaced from the central longitudinal axis of said tubular container.

11. The device of claim 1 wherein said slide member further includes a central viewing portion having internal wall means stepped inwardly from said slide member rear wall such that the thickness of the central viewing portion of the cavity is reduced by at least 50% relative to the thickness of the cavity outside said viewing portion.

12. The device of claim 11 wherein the thickness of the cavity in said central viewing portion is approximately 0.010 inch.

13. The device of claim 12 wherein the thickness of the central cavity outside said central viewing portion is in the range of approximately 0.02-0.04 inch.

14. The device of claim 11 wherein said wall means comprise an internal wall step extending inwardly from the rear wall toward the front wall of the slide member.

15. The device of claim 11 wherein said wall means comprise a plug element having a thickness which is less than the thickness of the cavity between said front and rear walls, said plug member being positioned within said cavity in the vicinity of the viewing portion and mounted against the rear wall of the slide member.

16. The device of claim 1 wherein the slide member further includes first reinforcing means coupled to the rear wall of the microscope slide member within a selected portion within the cavity between the front and rear walls for reinforcing said rear wall against distortion during centrifugation.

17. The device of claim 16 further including second reinforcing means extending along at least the front wall of the microscope slide member exterior thereto to reinforce said front wall during centrifugation.

18. The device of claim 17 wherein said second reinforcing means comprises a flexible strip extending continuously along the front and rear walls of the slide member to reinforce both the front and rear walls.

19. The device of claim 18 wherein said flexible strip is an adhesive strip releasably secured along at least said front wall.

20. The device of claim 19 wherein said strip includes a loose end pull tab and is only intermittently affixed to said front wall, the adhesion thereto being interrupted by transverse strips spaced at regular intervals along said front wall, said interrupted adhesion constituting means for generating a pressure wave in a specimen within said cavity to effect uniform mixing of sediment therein.

* * * * *